Nov. 22, 1949    C. F. SEIBEL    2,488,607
AUTOMATIC MESSAGE ACCOUNTING SYSTEM
Filed Dec. 23, 1944
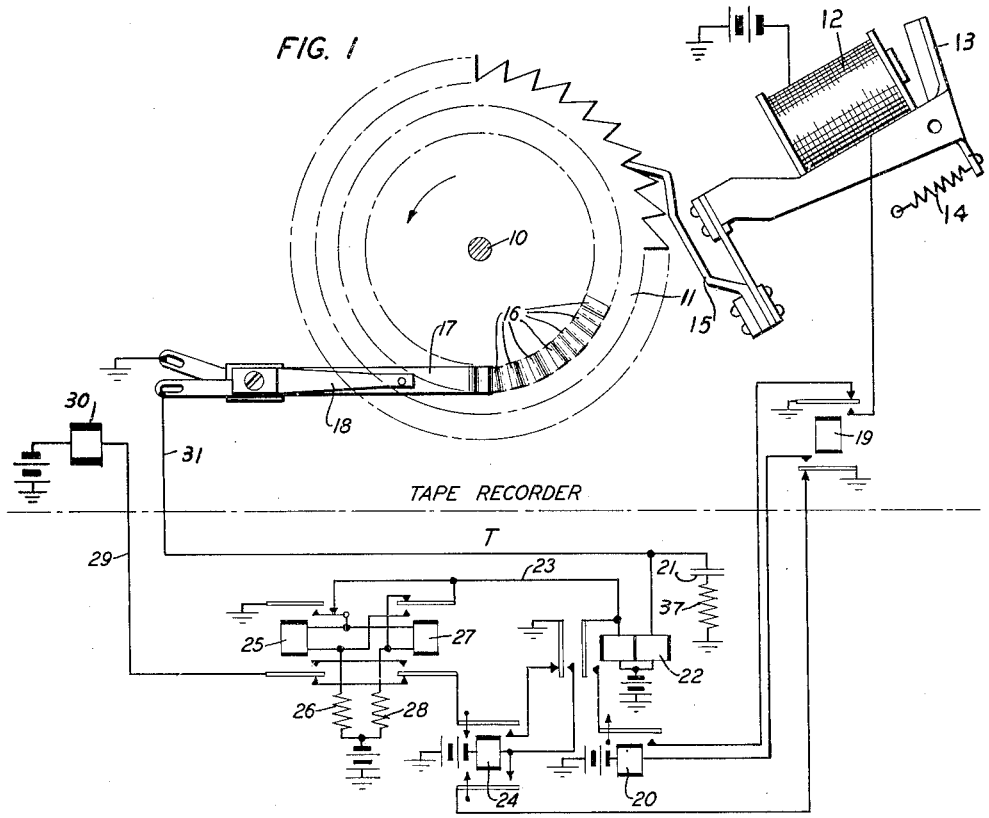
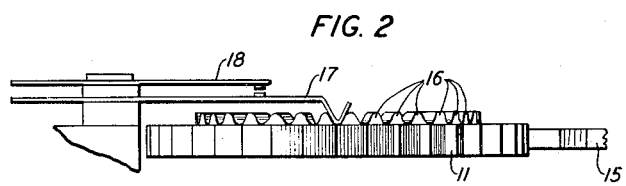
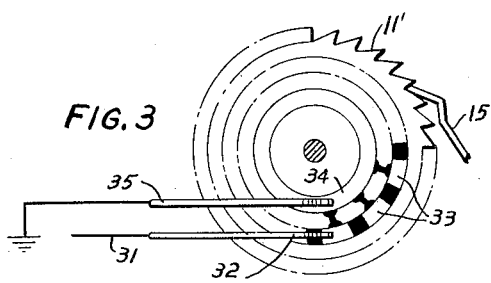
INVENTOR
C. F. SEIBEL
BY R. O. Covell
ATTORNEY Patented Nov. 22, 1949

2,488,607

UNITED STATES PATENT OFFICE 2,488,607

AUTOMATIC MESSAGE ACCOUNTING SYSTEM

Charles F. Seibel, Glen Rock, N. J., assignor to Bell Telephone Laboratories, Incorporated, New York, N. Y., a corporation of New York Application December 23, 1944, Serial No. 569,513

6 Claims. (Cl. 175—320)

This invention relates to testing and control devices and particularly to means for checking the step-by-step advance of a rotary mechanism.

In automatic ticketing equipment of the type adapted for use in telephone systems and comprising a tape recorder for recording various items involved in determining charges for telephone calls, it is essential that the tape be advanced after the recording of each item of information and that further recording be prevented in case the tape advance mechanism fails to operate. Objects of the invention are to provide means for checking the step-by-step advance of rotary mechanisms and to provide, in connection with a tape recorder, means for preventing further recording in case of failure to advance the tape after an item of information has been recorded.

The invention is a testing arrangement for checking the step-by-step operation of a rotary device. Features of the invention are the checking of the operation of the tape advance mechanism of a tape recorder and the control of the recorder to prevent reoperation until the tape has been advanced after each recording operation.

For a further description of the invention and its features, reference may be had to the drawing which represents schematically a rotary mechanism and one arrangement for checking its step-by-step advance. The invention is, however, not limited in its application to the specific forms of rotary mechanism and checking means shown in the drawing.

Fig. 1 shows a rotary mechanism for step-by-step advancing the tape of a tape recorder in the automatic ticketing equipment of an automatic telephone system and circuit testing means T for checking the advance of the mechanism;

Fig. 2 is another view of the pawl, toothed wheel and contact springs shown in Fig. 1; and Fig. 3 shows a modification of the wheel 11 of Fig. 1.

The rotary mechanism which is adapted to advance the tape of a tape recorder may be similar to that of the rotary selector disclosed in the patent to G. K. Hess No. 1,655,059, granted January 3, 1928. It comprises a fixed shaft 10, a toothed wheel 11, a pawl 15 and a stepping magnet 12. The pawl 15 is normally held in engagement with the toothed wheel 11 by a retractile spring 14. When the armature 13 is actuated by the energization of the winding of stepping magnet 12, the pawl 15 is withdrawn from engagement with the toothed wheel 11, thereby increasing the tension of the spring 14 and the pawl drops down into alignment with the next tooth of wheel 11. When the stepping magnet releases, the spring 14 pulls the pawl 15 into engagement with the next tooth of wheel 11 thereby advancing the tape feeding mechanism one step. One side of wheel 11 has a circle of raised segments 16 which are engaged in succession by the curved end of a contact spring 17. There is a raised segment 16 for each tooth of wheel 11 and the segments are so spaced with respect to the teeth that the end of spring 17 rests between segments when the wheel is in any position of rest. The spring 17 is actuated into engagement with another contact spring 18 whenever the wheel 11 has been moved out of one position of rest and has not reached the next position of rest. While not shown in the drawing, the shaft 10 carries the tape feeding drum of a tape recorder whereby the tape is advanced each time the wheel 11 is stepped from one position to the next by the operation and release of stepping magnet 12.

The above-described rotary mechanism is a part of a tape recorder in an automatic telephone system which is seized when some item of information relating to a call then in progress is to be recorded. Reference may be had to the patent to W. W. Carpenter and W. H. Matthies No. 2,112,951, granted April 5, 1938 for a complete disclosure of a recorder equipment and those parts of a telephone system which cooperate therewith to make the necessary records for call charging purposes. When the recorder is seized and a test circuit for a chain of perforator magnets (not shown) is closed, a timing relay 19 in the recorder operates to close a circuit for operating the paper advance stepping magnet 12. The operation of relay 19 also closes a circuit for operating relay 20 of the testing means T. When the perforator magnets have been operated and have had time to release, the timing relay 19 releases thereby releasing stepping magnet 12 whereby the wheel 11 and tape drum of the recorder are advanced one step. As soon as the wheel 11 is advanced out of a position of rest by the release of stepping magnet 12, contact spring 17 is actuated by an interposition raised segment 16 to make contact with the spring 18 thereby closing a circuit for discharging condenser 21 and for energizing the right winding of relay 22. If the advance of wheel 11 to the next position of rest is not completed, the circuit through springs 17, 18 is closed long enough to effect the operation of relay 22;

and, if the advance to the next position is completed without delay so that springs 17, 18 are only momentarily closed, the energization of the winding of relay 22 is maintained by current charging condenser 21 long enough to effect the operation of relay 22. In either case, relay 22 closes a locking circuit through its left winding and inner front contacts, thence through a front contact of relay 20 and a back contact of relay 19. Relay 20 is somewhat slow in releasing so that relay 22 will be held operated by its locking winding for an interval long enough for wheel 11 to have completed a step from one position to the next. With relay 22 operated, the ground at the upper back contact of relay 19 is connected through the front contact of relay 20, locking contact of relay 22, conductor 23, and continuity back contact of relay 25 to the winding of relays 25 and 27. Relay 25 operates, but relay 27 does not operate at this time because its winding is short-circuited through its upper back contact. The aforementioned operation of relay 22 also closes a circuit for operating relay 24, but relay 24 is slow in operating so that relay 25 operates and opens its lower back contact before relay 24 closes its upper front contact. When operated, relay 24 locks under control of relay 19. The winding of relay 27 continues to be short circuited, after relay 25 is operated, until relay 20 releases; at which time, the wheel 11 should have completed its advance into the next position of rest. If the wheel 11 has not yet reached the next position of rest, relay 22 is held operated by the continued energization of its right winding. But, if the wheel 11 has reached the next position of rest, spring 17 is no longer engaging spring 18 so that the operating circuit through the right winding of relay 22 is opened; and consequently the release of relay 20 causes the release of relay 22. In either case, the release of relay 20 also disconnects ground from conductor 23; and relay 27 is thereupon operatively energized in series with resistor 28 and the upper front contact of relay 25. The operation of relay 27 prepares a short-circuit for relay 25 and further opens the short-circuit previously existing across its own winding. If, when relay 27 operates, relay 22 has released due to the wheel 11 having been advanced to the next position of rest, a connection is closed from ground at the back contact of relay 22 through a front contact of relay 24 and through front contacts of both of relays 27 and 25, to conductor 29 to operate a relay 30 and thereby render the recorder effective to record the next item of information. But, if relay 22 is held operated because the advance of wheel 11 to the next position has not been completed, the operation of relay 27 is ineffective to complete the connection of ground to conductor 29 and the recorder is unable to record another item of information.

After relay 30 of the recorder has operated, due to the connection of ground to conductor 29, and as soon as the aforementioned check circuit for the perforator magnets is closed, the timing relay 19 is again operated, as described in the abovementioned Carpenter-Matthies patent. The operation of relay 19 causes the release of relay 24, the reoperation of relay 20 and the reoperation of stepping magnet 12. The release of relay 24 disconnects ground from conductor 29. At the end of an interval long enough for the perforator magnets to have released after recording a second item of information, relay 19 releases. The release of relay 19 causes the release of stepping magnet 12 to advance wheel 11 to the next position. When wheel 11 moves out of the position in which the second item of information was recorded, spring 17 is actuated by the next interposition segment 16 to engage spring 18 so that condenser 21 is discharged and the right winding of relay 22 is operatively energized as hereinbefore described. Relay 22 again closes a locking circuit through its left winding, closes a circuit for operating relay 24 and reconnects ground to conductor 23 thereby short-circuiting the winding, and causing the release, of relay 25. The aforementioned release of relay 19 also opens the operating circuit of relay 20, but relay 20 is slow in releasing so that the locking circuit of relay 22 is closed long enough to release relay 25 and long enough for wheel 11 to have been advanced to the next position. Since relay 24 is slow in operating, relay 25 releases and opens its lower front contact before relay 24 closes its upper front contact. After relay 25 releases, relay 27 is held operated through the continuity back contact of relay 25 to the grounded conductor 23. When relay 20 releases, ground is disconnected from conductor 23 and relay 27 releases. If at this time relay 22 is being held operated because the wheel 11 has not completely advanced to the next position of rest, ground is not connected to conductor 29; but, if the wheel 11 did complete the step, relay 22 has again released and the release of relay 27 completes a connection from ground at the back contact of relay 22, through the upper front contact of relay 24 and back contacts of relays 27 and 25, to conductor 29 to prepare the recorder for recording another item of information.

Thus on each complete step of wheel 11, relays 25 and 27 are either both operated to affect the connection of ground to conductor 29 or are both released to effect the connection of ground to conductor 29, thereby to prepare the recorder for operation to record another item of information. If the wheel 11 is not moved responsive to the operation and release of relay 19, relay 22 remains normal and in this case relay 24 is not operated and ground is not connected to conductor 29 so that the recorder cannot be operated to record another item of information without advance of the tape. If the wheel 11 moves out of one position but does not move a full step into the next position of rest, relay 22 is held operated so that although relays 25 and 27 have both been operated or both released in the manner above described, ground is not connected to conductor 29 and further recording is prevented.

It is to be noted that the wheel 11 may be modified, as shown in Fig. 3, by substituting a commutator having alternate conducting and non-conducting segments and a commutator brush in place of the raised segments 16 and contact springs 17, 18. The conducting segments 33 are connected, through a feed ring 34 and brush 35, to ground; and, while the commutator brush 32 is in engagement with any interposition segment 33, this ground is connected to conductor 31 to operatively energize the right winding of relay 22.

Other modifications may be made without departing from the spirit of applicant's invention, the scope of which is set forth in applicant's claims.

What is claimed is:

1. In combination, a rotary mechanism having a plurality of positions of rest and comprising means for advancing said mechanism one position at a time, a pair of contact springs closed while said mechanism is intermediate any two of said positions, a relay, a source of current connected in series with the winding of said relay and said contact springs, and a condenser and resistor connected in series with said winding and source and in parallel with said contacts thereby to insure the operative energization of said winding each time said contacts are closed.

2. In combination, a rotary mechanism having a plurality of positions of rest and comprising means for advancing said mechanism one position at a time, a pair of contact springs closed while said mechanism is intermediate any two of said positions, a relay, a source of current connected in series with the winding of said relay and said contact springs, and a condenser and resistor connected in series with said winding and source and in parallel with said contacts thereby to insure the operative energization of said winding each time said contacts are closed, and means for locking said relay operated.

3. In combination, a rotary mechanism having a plurality of positions of rest and comprising means for advancing said mechanism one position at a time, a relay, electrical contact means rendered effective by movement of said rotary mechanism from each of said positions for closing an energizing circuit through the winding of said relay while said mechanism is moving from each of said positions to the next, and means comprising a condenser and resistor connected in series with said winding to insure the operation of said relay each time said mechanism advances from any one of said positions to the next.

4. In combination, a rotary mechanism having a plurality of positions of rest and comprising means for advancing said mechanism one position at a time, a relay, electrical contact means rendered effective by movement of said rotary mechanism from each of said positions for closing an energizing circuit through the winding of said relay while said mechanism is moving from each of said positions to the next, means comprising a condenser and resistor connected in series with said winding to insure the operation of said relay each time said mechanism advances from any one of said positions to the next, and circuit means rendered effective only in case said relay is operated and released responsive to the movement of said mechanism from any one of said positions to the next.

5. In combination with a rotary mechanism having a plurality of positions of rest and comprising means including a stepping magnet for advancing said mechanism one step at a time, a relay, means for operating said relay responsive to movement of the mechanism out of each position of rest and for holding said relay operated until said mechanism reaches the next position of rest, means for holding said relay operated for an interval of time sufficient for said mechanism to have been advanced to the next position of rest, and means responsive to the release of said relay following each operation of said relay.

6. In combination with a rotary mechanism having a plurality of positions of rest and comprising means for advancing said mechanism one step at a time, a relay, means comprising a commutator and commutator brush for operating said relay responsive to movement of the mechanism out of any position of rest and for holding said relay operated until said mechanism reaches the next position of rest, means for holding said relay operated for an interval of time sufficient for said mechanism to have been advanced to the next position of rest, and means responsive to the release of said relay following each operation of said relay.

CHARLES F. SEIBEL.

REFERENCES CITED

The following references are of record in the file of this patent:

UNITED STATES PATENTS

| Number | Name | Date |
| --- | --- | --- |
| 2,101,269 | Pudelko | Dec. 7, 1937 |
| 2,108,777 | Mixer | Feb. 15, 1938 |
| 2,178,112 | Barker | Oct. 31, 1939 |
| 2,233,533 | James | Apr. 4, 1941 |
| 2,269,639 | Swartzel | Jan. 13, 1942 |
| 2,351,229 | Potts | June 13, 1944 |

FOREIGN PATENTS

| Number | Country | Date |
| --- | --- | --- |
| 10,655 | Australia | Nov. 30, 1927 |
| 78,322 | Sweden | Sept. 12, 1933 |